United States Patent [19]

Spector

[11] Patent Number: 5,740,155
[45] Date of Patent: Apr. 14, 1998

[54] DISPLAY PANEL AND COMPACT DISC ASSEMBLY

[76] Inventor: Donald Spector, 380 Mountain Rd., Union City, N.J. 07087

[21] Appl. No.: 919,243

[22] Filed: Jul. 27, 1992

Related U.S. Application Data

[63] Continuation-in-part of Ser. No. 821,062, Jan. 16, 1992, abandoned, which is a continuation-in-part of Ser. No. 701,078, May 16, 1991, Pat. No. 5,090,561.

[51] Int. Cl.$^6$ .......................... G11B 23/03; B65O 85/57
[52] U.S. Cl. .................. 369/291; 206/308.1; 206/312
[58] Field of Search .................................. 369/291, 273; 206/444, 313, 308.1, 309, 310, 311, 312; 360/133

[56] References Cited

U.S. PATENT DOCUMENTS

| | | | |
|---|---|---|---|
| 1,121,239 | 12/1914 | Fuller | 369/273 |
| 1,399,257 | 12/1921 | Emerson | 369/273 |
| 1,479,847 | 7/1924 | Widmann | 369/273 |
| 2,691,440 | 10/1954 | Spugios et al. | 206/312 |
| 2,714,448 | 3/1955 | Brown | 369/291 |
| 3,430,761 | 3/1969 | Pelkey | 369/273 |
| 5,090,561 | 2/1992 | Spector | 206/444 |
| 5,188,229 | 2/1993 | Bernstein | 206/312 |

*Primary Examiner*—Stuart S. Levy
*Assistant Examiner*—William J. Klimowicz

[57] ABSTRACT

A display panel and compact disc assembly whose panel is contour cut to define the silhouette of an image of a subject such as a well-known baseball player or a fanciful character. The compact disc is nested within a circular well recessed in the front face of the panel, the side of the disc which carries a recording relating to the subject then lying adjacent the base of the well. The exposed side of the disc which lies flush with the front face of the panel has a printable surface thereon. Printed on the front face of the panel is the image of the subject whose outline forms the silhouette, a significant portion of this image appearing on the printable surface on the exposed side of the disc. The same portion of the image is printed on the base of the well. Hence when the image of the subject is viewed with the disc in place, the viewer sees the entire image, and when the disc is removed from the panel, one still sees the entire image.

5 Claims, 2 Drawing Sheets

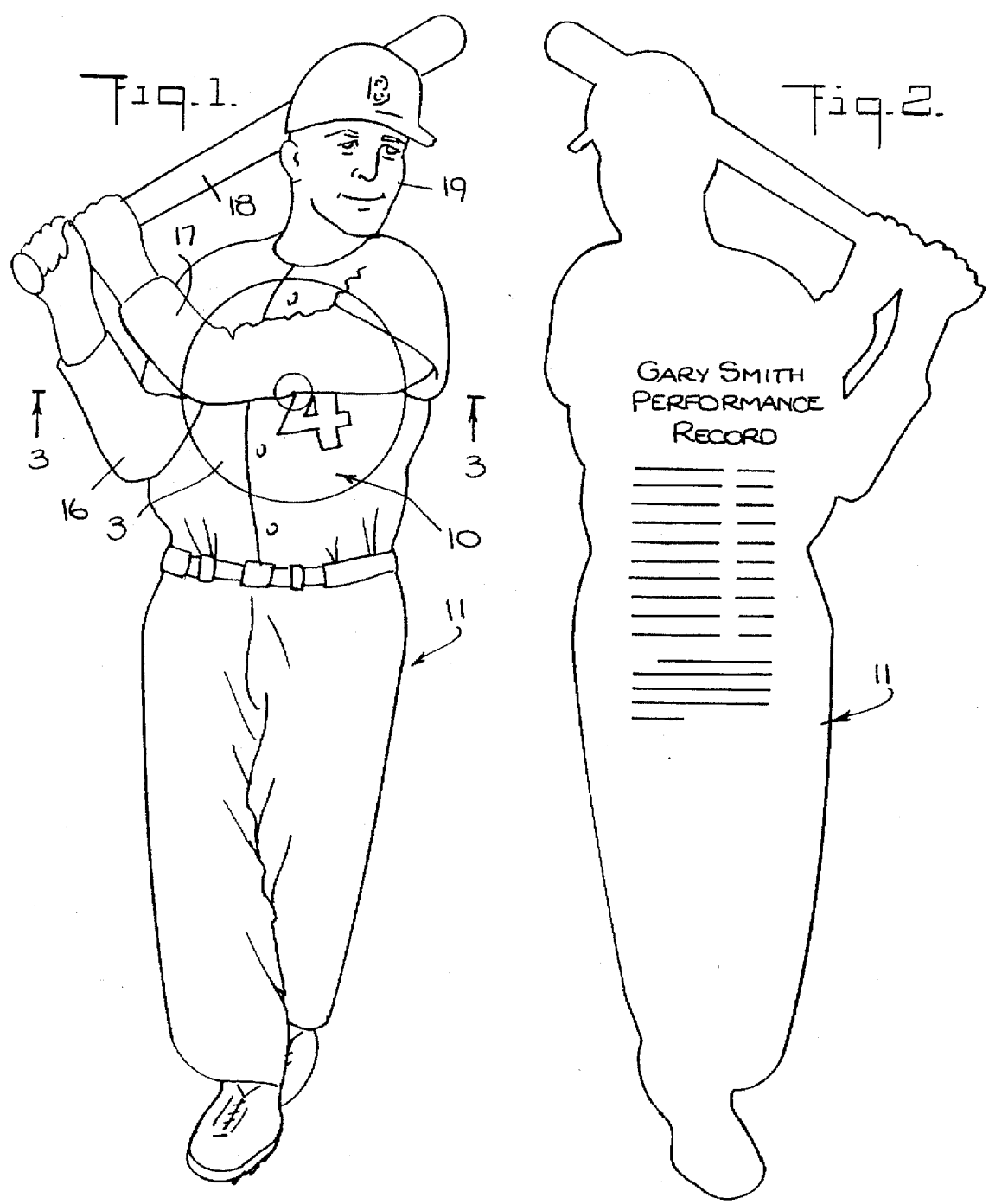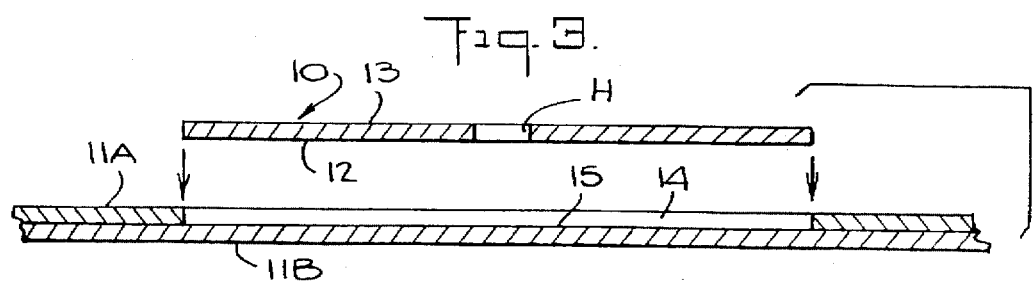

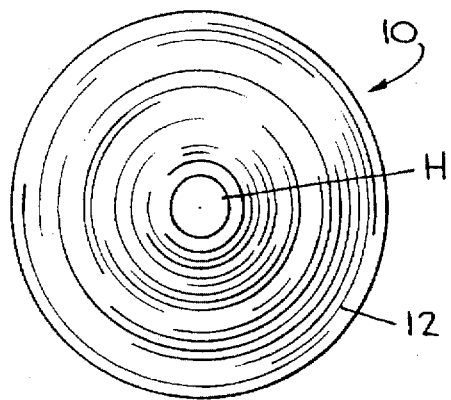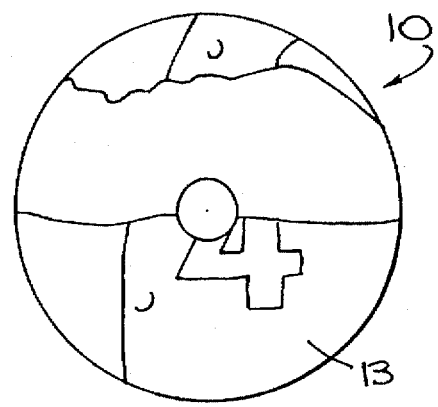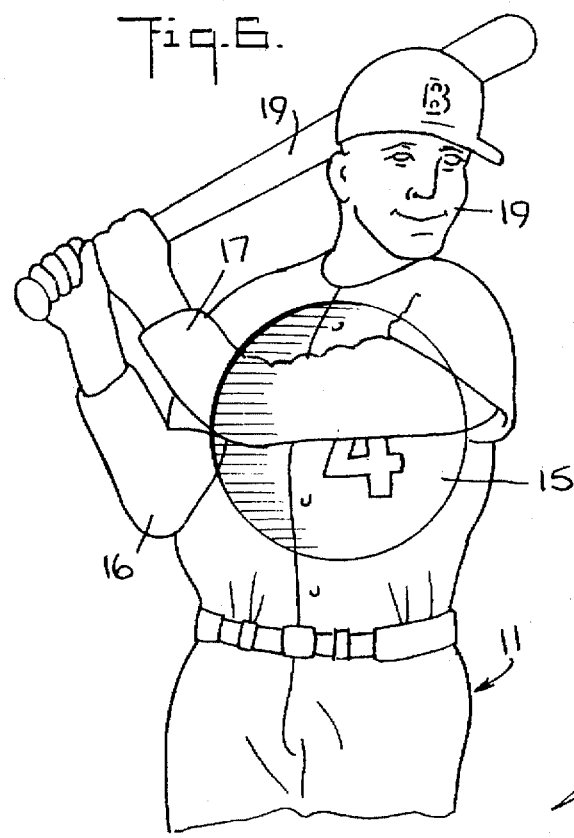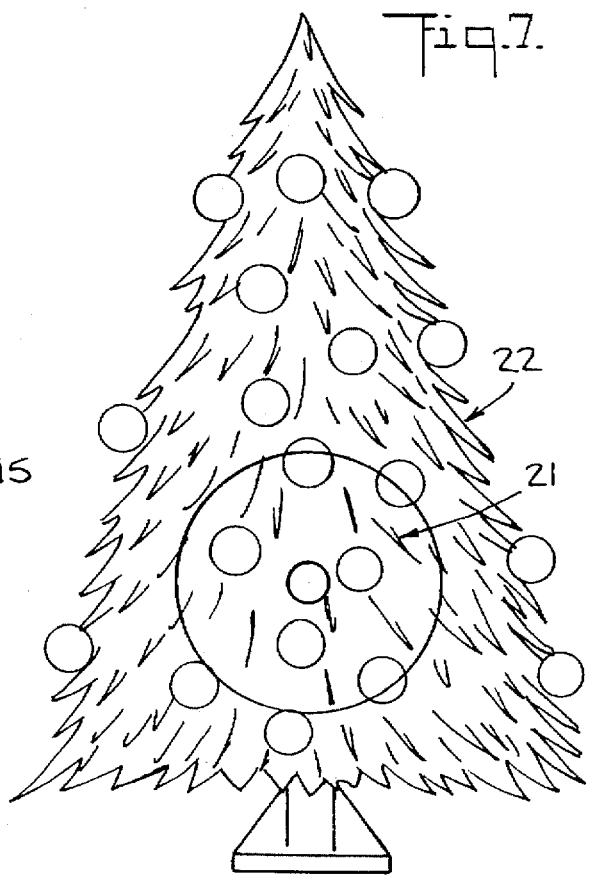

5,740,155

DISPLAY PANEL AND COMPACT DISC ASSEMBLY

RELATED APPLICATION

This application is a continuation-in-part of my application Ser. No. 821,062, filed Jan. 16, 1992, entitled "Compact Disc Package,", now abandoned, which in turn is a continuation-in-part of my parent application Ser. No. 701,078 of the same title, filed May 16, 1991, now U.S. Pat. No. 5,090,561, whose entire disclosures are incorporated herein by reference.

BACKGROUND OF INVENTION

1. Field of Invention

This invention relates generally to a display panel on whose front face is printed an image of a subject such as a well-known personality or a fanciful character, the panel being contour-cut to define the silhouette of this image, thereby creating a two-dimensional, quasi-sculptural replica of the subject, and more particularly to an assembly in which the contour-cut panel has nested therein a compact disc carrying a recording relating to the subject whose image is displayed by the panel.

2. Status of Prior Art

A silhouette is an outline image of an individual or of a three-dimensional object, such as a profile drawing solidly filled in, or a cutout pasted against a lighter background to display the outline image more prominently.

In the 19th century, the popularity of silhouettes waned; for with the invention of the daguerrotype, it then became possible to produce a photographic image on a silver-coated metal plate. In recent years, cardboard panels carrying photographed images have been die cut so as to profile the image appearing thereon, thereby creating a two-dimensional replica of the photographed individual or whatever else constituted the subject of the photograph.

My above-identified copending patent application discloses a compact disc having impressed on one side a sound or video recording (CD or VCD) relating to a particular subject. This subject may be a well-known individual or a fanciful character, such as a famous sports or entertainment figure or a comic strip character. The other side of the disc is provided with a printable surface.

This compact disc is nested within a circular well recessed in the front face of a rectangular card of flexible material, the recorded side of the disc lying adjacent the base of the well, and its exposed printable side lying flush with the region on the front face of the card surrounding the disc. Printed on the exposed side of the disc and in the surrounding region of the card is an image of the subject to which the disc recording relates, so that a significant portion of the image appears on the disc. The same image portion is printed on the base of the well. Hence when the card is flexed to pop out the disc, and the card is seen with the disc omitted, one then still sees the entire image.

Thus the card serves not only to package the disc, but, in combination with the disc, it also provides an image of the subject to which the recording on the disc is related.

If, therefore, the image printed on the front face of the card is that of a well-known baseball player, the recording on the disc may carry an interview with this player in which he gives an account of memorable games he had played in the course of his career. And on the rear of the card is printed the batting average of the player and other data regarding his performance record.

The dimensions of this disc-loaded card are not much greater than that of the disc itself. A typical CD has a diameter of about 4½ inches; hence the rectangular dimensions of the card are about 5½ by 6 inches. The reason for this relationship is that the card is intended to be used in a manner equivalent to that of a conventional, collectible baseball card that can be flipped in play or traded.

But while this card carries an image of a baseball player (or any other character), the scale of this image is relatively small; hence it is not large enough for effective display on a wall. If, for example, a child has a favorite classic baseball player, such as Lou Gehrig of the New York Yankees or Joe Di Maggio, and wishes to hang up on his bedroom wall a large size picture of this player, the card falls short of this requirement.

It is to be understood that baseball player images are by way of example only, for the invention is applicable to any subject, which may be a figure or personage of historical, political, scientific or military importance, as well TV and cinema personalities. Also, the subject may be a comic strip character, or living or prehistoric animals, and even inanimate objects, such as Xmas trees or classic automobiles. But whatever the subject, the recording on the disc deals in some way with this subject, and the image appearing on the card or plate in which the disc is nested is that of the same subject.

The following references are of prior art interest:

| U.S. Patents | |
| --- | --- |
| Henkel | 5,048,681 (1991) |
| Fullove | 4,402,405 (1983) |
| Brody | 2,777,574 (1957) |
| Coangelo | 4,473,153 (1984) |
| Youngs | 4,850,731 (1989) |
| Woodriff | 5,031,772 (1991) |
| Herr et al. | 4,899,875 (1990) |

SUMMARY OF INVENTION

In view of the foregoing, the main object of this invention is to provide a display panel and compact disc assembly which forms a two-dimensional replica of a subject, such as a baseball player or other well-known figure, or that of a fanciful character, the compact disc carrying a recording related to the subject.

An important feature of the invention is that it supplies a user, not only with a large-scale image of a baseball player or other personage in which the user has a strong interest, but also with printed data related to this player's performance record, and a CD recording in which the player's voice is heard. Hence as the user listens to this recording, he can at the same time view an image of the player and thereby experience a sense of intimacy with the player.

More particularly, an object of this invention is to provide an assembly of the above type in which the panel is coutour cut to create a silhouette of an image of the subject, which image is printed on the front face of the panel, so that the panel is a replica of the subject in a quasi-sculptural form, the compact disc being nested in the panel which functions as a package therefor.

A significant advantage of the invention is that the replica of the subject is in a relatively large scale and may be supported on a wall or mounted on a stand or easel.

Briefly stated, these objects are attained in a display panel and compact disc assembly whose panel is contour cut to define the silhouette of an image of a subject such as a well-known baseball player or a fanciful character. The compact disc is nested within a circular well recessed in the front face of the panel, the side of the disc which carries a recording relating to the subject lying then adjacent the base of the well. The exposed side of the disc which lies flush with the front face of the panel has a printable surface thereon.

Printed on the front face of the panel is the image of the subject whose outline forms the silhouette, a significant portion of this image appearing on the printable surface on the exposed side of the disc. The same portion of the image is printed on the base of the well. Hence when the image of the subject is viewed with the disc in place, the viewer sees the entire image, and when the disc is removed from the panel, one still sees the entire image.

BRIEF DESCRIPTION OF DRAWINGS

For a better understanding of the invention as well as other objects and further features thereof reference is made to the following detailed description to be read in conjunction with the accompanying drawings, wherein:

FIG. 1 is a front view of one embodiment of a display panel and CD assembly in accordance with the invention;

FIG. 2 is a rear view of the assembly;

FIG. 3 is a transverse section taken in the plane indicated by line 3—3 in FIG. 1;

FIG. 4 shows the recorded side of the CD;

FIG. 5 shows the printable, unrecorded side of the CD;

FIG. 6 is a front view of the same assembly with the CD omitted; and

FIG. 7 is a front view of another embodiment of the assembly.

DESCRIPTION OF INVENTION

First Embodiment

Referring now to FIGS. 1 and 2, there is shown one preferred embodiment of a display panel and compact disc (CD) assembly in accordance with the invention, the CD being generally designated by numeral 10 and the panel by numeral 11.

As shown separately in FIGS. 4 and 5, compact disc 10 is provided with a center hub hole H so that the disc can be mounted on the spindle of an optical player. The disc is formed of transparent plastic material whose shiny recording side 12 has a spiral track formed thereon that is coated with a reflective film.

Printed on the surface of a disc-shaped sheet of paper 13 adhered to the opposite unrecorded side of disc 10 is a significant portion of a picture or drawing of a subject about whom revolves the story or data recorded on side 12 of the disc. The remaining portion of the picture or drawing appears on the front face of plate 11. In practice, instead of printing on the surface of paper 13, one may dispense with the paper and print directly on the unrecorded side of the disc.

By way of example only, the subject is a GARY SMITH, who we shall assume is a famous baseball player, and the picture shown is that of this subject. The story recorded on disc 10 may be an account of GARY SMITH's boyhood and how he eventually succeeded in baseball despite a series of setbacks, or it may be an interview with this player in which his voice is heard. Hence the recording is related to the same subject whose image appears on the panel. Since the disc is intended mainly for children, the recording should be at a level appropriate to the typical listener.

The term "subject," as used herein, refers to any figure or personage of historical, political, scientific or military importance, as well as any well-known actor or sports figure that children or others wish or ought to know more about. The term "subject" also encompasses animals, such as prehistoric dinosaurs or apes who play a role in the evolution of man. And the term subject includes inanimate objects such as castles and trees. Hence the CD recording in all cases is germane to the particular subject whose image appears on the panel.

Panel 11, which is formed of flexible material, is preferably constituted by two plies of paperboard 11A and 11B which are laminated together, as shown in FIG. 3. The thickness of the upper paperboard ply 11A matches the thickness of CD 10. Die cut into ply 11A is a circular opening 14 whose diameter matches that of CD 10 to form a well for nesting the CD, the base 15 or bottom of this well being the circular region on the face of the lower paperboard ply 11B whose perimeter is defined by opening 14.

CD 10, when snugly nested in well 14, then has its recorded side 12 lying against the base 15 of the well and its exposed side 13 substantially flush with the surface of the front face of panel 11. The image of the subject, in this instance the baseball player Gary Smith, is printed on the front face of panel 11 and on the exposed, printable side of CD 10 nested in the plate. This image shows hands 16 and 17 of the player grasping a bat 18 which extends behind his head 19.

The portion of the total image which is included on surface 13 of CD 10 is the chest portion of the baseball player's uniform and the large team number 4 thereon. Obviously, the portion of the image which appears on the CD depends on the nature of the total image; but without this significant portion, the image is incomplete.

As shown in FIG. 6, the same significant portion of the total picture is printed on the corresponding region on base 15 of well 14. Hence when CD 10 is nested in the well, it then masks base 15 except for the central zone therein exposed through hole H in the disc. But this zone has printed thereon that sub-portion of the picture which was excised by the hole. Hence when looking at the panel with the CD in place, no portion of the total picture is deleted.

Thus when CD 10 is in place on the panel, one sees the entire image; and when the CD is withdrawn from the well, one still sees the entire image.

It is a simple matter to remove CD 10 from panel 11, for one has only to flex the panel and the CD will then pop out, the panel then resuming its planar form. And it is no more difficult to return CD 10 to the well, for one has only to press it in, being sure, however, that the portion of the image on the exposed side of the CD is in proper registration with the remaining portion on the face of the panel. The CD and the panel may include markers for this purpose.

Initially, panel 11 is in a rectangular form whose dimensions are such that no part of the image printed therein is excluded. The panel is then die cut to outline the image of the player and the bat he is holding to create open spaces between the extended arms and between the bat and the shoulder of the player, thereby producing a silhouette. Hence the die-cut panel is a two-dimensional, quasi-sculptural replica of the player holding a bat in the posture he assumes before striking a ball.

In practice, this replica may be about two feet in height and about a half foot wide, so that the replica is a reduction by 3 in scale of the real life figure. However, the replica can be made in any desired scale, including full scale.

The replica can be mounted on a wall, but in that event it should be spaced somewhat from the wall so that the contoured plate can be flexed to pop out the CD. Or the replica can be mounted on a base stand or on an easel.

Second Embodiment

The invention is by no means limited to two-dimensional replicas of characters or personalities; for, as shown in FIG. 7, a display panel and compact disc assembly may be designed to produce an image of an Xmas tree illuminated by candles and decorated with colorful balls and other ornaments. The compact disc 21, in this instance, which nests in a circular well formed in panel 22, contains a recording appropriate to the Xmas season, such as a chorus singing carols.

And panel 22, which is formed of paperboard or other flexible material, is die-cut so as to profile the Xmas tree and produces a silhouette thereof. Here, too, a portion of the total image of the tree appears on the exposed side of CD 21, the remaining portion on base panel 22. And the portion of the image which appears on the CD is also imprinted on the base of the well in which the CD is nested, so that one sees the total image, whether or not the CD is in place.

In this embodiment, the rear face of the panel may have printed thereon information relating to Xmas and it may also have coated thereon a layer of rupturable micro capsules containing the evergreen fragrance of an Xmas tree. Thus by scratching this surface, the room in which this assembly is placed will be suffused with the fragrance of an Xmas tree. This fragrance combined with Xmas music from the played-back CD will create a pleasing Xmas environment. The top of the die-cut panel may be provided with a hole to facilitate the suspension of the assembly at a suitable site.

In practice, a user who is a dedicated fan of a particular baseball team, say, the Boston Red Sox, may be provided with a set of a contoured panel and compact assemblies, one for each player on the team, each compact disc carrying a recording made by a respective player on the team. Thus when a particular baseball team wins the World Series, a memorial of this event may be produced by a set of such assemblies, one for each winning player on the team.

While there have been shown and described preferred embodiments of a display panel and compact disc assembly in accordance with the invention, it will be appreciated that many changes and modifications may be made therein without, however, departing from the essential spirit thereof.

It is to be noted that CDs are currently all in circular form. But there is no technical requirement which dictates this form, and should CDs become available in a form other than circular, the well in the panel in which such CDs are nested will have a shape conforming thereto.

As previously noted, in making the contoured panel which creates a two-dimensional replica of a subject, one starts with a rectangular panel which is then die cut to outline the image of the subject printed on the panel. One is then left with a rectangular panel having an opening therein whose shape matches that of the replica. Instead of discarding this die-cut rectangular panel as waste, it may be used as a package for the replica which is retained within the opening and for the CD nested in the replica. A package in this form is easier to ship and store, and serves to protectively house the replica.

I claim:

1. A display panel and compact disc assembly comprising:
   (a) a panel on whose front face is recessed a circular well having a flat base; and
   (b) a compact disc nested in the well, one side of the disc carrying a recording relating to a well-known individual, character or other subject, this side lying adjacent the base of the well, the other side of the disc being substantially flush with the front face of the panel and having a printable surface, an image of said subject being printed on the front face and on the disc surface, whereby a portion of the image appears on the disc surface, the same portion being printed on the base of the well so that the image is fully seen whether or not the compact disc is in place in the well, said compact disc being provided with a center hub hole which excises a sub-portion of the portion of the image printed on the surface of the disc, which excised portion is seen through the hole on the base of the well, said panel being contoured to define a silhouette of the image, thereby forming a two-dimensional replica of the subject, said panel being of flexible material and said compact disc fitting snugly in said well, whereby when the panel is flexed, the disc pops out of the well.

2. An assembly as set forth in claim 1, wherein said disc has a predetermined thickness and said well has a depth substantially equal to said thickness.

3. The assembly as set forth in claim 1, wherein said image is that of a sports figure having a given height and said two-dimensional replica is a reduced scale reproduction of this figure.

4. An assembly as set forth in claim 3, wherein said replica is about two feet in height.

5. An assembly as set forth in claim 1, wherein said panel is formed by two interlaminated plies of paperboard, one ply having a circular opening cut therein to define said well whose base is on the face of the other ply encircled by the opening.

* * * * *